E. P. TORREY.
Ice Cream Freezer.
No. 31,497.             Patented Feb. 19, 1861.
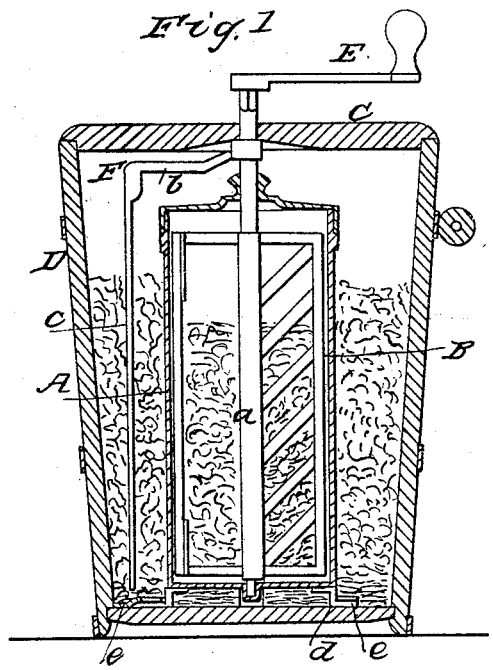
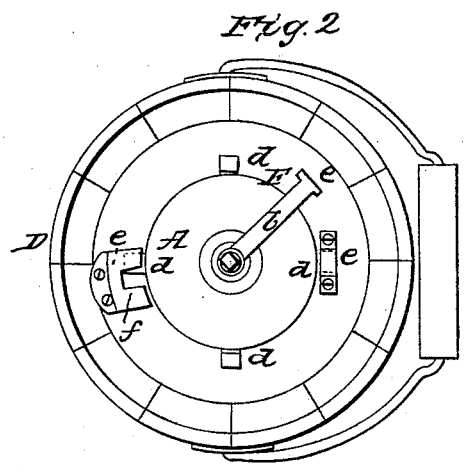
Witnesses
Inventor

UNITED STATES PATENT OFFICE.

E. P. TORREY, OF NEW YORK, N. Y.

ICE-CREAM FREEZER.

Specification of Letters Patent No. 31,497, dated February 19, 1861.

*To all whom it may concern:*

Be it known that I, E. P. TORREY, of the city, county, and State of New York, have invented a new and Improved Ice-Cream Freezer; and I do hereby declare that the following is a full, clear, and exact description of the same, reference being had to the accompanying drawing, forming a part of this specification, in which—

Figure 1 is a vertical central section of this invention. Fig. 2 is a plan or top view of the same, the cover of the tub having been removed to expose the interior of the freezer.

Similar letters of reference in both views indicate corresponding parts.

It is a well known fact in natural philosophy that ice as it changes from its solid into a fluid state, that is, during the process of melting, takes up some heat, which afterward remains as latent heat in the water. The heat thus required by a piece of ice to enable it to melt is extracted from the bodies with which the ice is brought in contact and the bodies surrounding the ice are cooled off as the melting of the ice proceeds. The absorption of the heat of the melting ice is the more rapid, the quicker the melting process of the ice proceeds and the temperature of the surrounding bodies sinks lower down, if the melting takes place quickly than it does if the melting of the ice takes place slowly. In view of this fact I have connected with my can an agitator which is so arranged that on giving motion to the beater or other device for the purpose of agitating the cream in the can, said agitator is caused to pass through the ice and salt, which is packed around the can on its outside and by thus agitating the ice and salt the melting of the same is accelerated and the cream in the can forms into ice in a much shorter time than with cream freezers of the ordinary construction.

To enable those skilled in the art to make and use my invention I will proceed to describe its construction and operation with reference to the drawing.

The can A with the beater B are constructed as I have described them in the patent granted to me for an ice cream freezer January 17th, 1860. The stem $a$ of the beater projects through the top of the can and also through the cover C of the tub D and a handle E which is attached to the end of the stem, serves to give motion to the beater.

The ice and salt are packed around the can A in the usual manner and an agitator F is rigidly attached to that portion of the stem $a$, which is contained between the top of the can and the inside of the cover C of the tub. This agitator consists of a horizontal arm $b$, from which a plate $c$, extends in a vertical direction nearly down to the bottom of the tub. If the stem $a$, is rotated, the plate $c$, of the agitator sweeps through the ice and salt and by keeping them in motion facilitates the melting process.

It is obvious that where the can is made to rotate, which is the case with some freezers, the agitator must be secured to the outside of the can, but its effect on the ice and salt will be the same as it is if the agitator is fastened to the rotary stem of the beater as above described. As the ice melts, and especially if the can is only partially filled it (the can) is liable to float up and to rotate with the beater. To prevent this I have secured to the bottom of the can four (more or less) legs $d$, made of thin sheet iron or other suitable material bent over twice at right angles, as clearly shown in Fig. 1. The lower flat part of these legs is made to catch into loops, $e$, which are rigidly attached to the bottom of the tub. One of the loops is provided with a slot $f$ on the top to admit of inserting and taking out the leg, and after the leg is inserted by turning the can a little ways in one direction or in the other, said leg is made to catch under the sides of the loop and the can is firmly held down to the bottom of the tub; and at the same time it is most effectually prevented from turning around with the beater. The legs $d$ applied in combination with the loops $e$ have the same function as the legs and crossbar described in my former patent; with these legs and the crossbar however no provision is made to hold the can down, and if the same is only partially filled and the ice commences to melt, it (the can) floats up and the legs loose their hold on the crossbar and allow the can to turn around with the beater. By the combination of the loops with the bent legs, the floating of the can is prevented.

These improvements render my ice cream freezer much more effective and more convenient than others of ordinary construction.

Having thus fully described my invention, what I claim as new and desire to secure by Letters Patent, is—

The arrangement of a rotary agitator F or its equivalent in combination with a can A and tub D of an ice cream freezer constructed and operating substantially in the manner and for the purpose specified.

EDW. P. TORREY.

Witnesses:
W. P. BENDRÉ,
M. M. LIVINGSTON.